(12) United States Patent
El-Hassan et al.

(10) Patent No.: US 12,375,191 B2
(45) Date of Patent: Jul. 29, 2025

(54) RADIO FREQUENCY HANDSET CALIBRATION BASED ON ANTENNA GAIN

(71) Applicant: Apple Inc., Cupertino, CA (US)

(72) Inventors: Wassim El-Hassan, San Jose, CA (US);
Gurusubrahmaniyan Subrahmaniyan Radhakrishnan, San Jose, CA (US);
Srinivasa Yasasvy Sateesh Bhamidipati, Milpitas, CA (US);
Daphne Irene Gorman, San Jose, CA (US); Vineet Nayak, Sunnyvale, CA (US); Xuefeng Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/356,898

(22) Filed: Jul. 21, 2023

(65) Prior Publication Data

US 2023/0361889 A1 Nov. 9, 2023

Related U.S. Application Data

(63) Continuation of application No. 17/065,829, filed on Oct. 8, 2020, now Pat. No. 11,722,230.
(Continued)

(51) Int. Cl.
*H04B 17/13* (2015.01)
*H01Q 1/00* (2006.01)
(Continued)

(52) U.S. Cl.
CPC .............. *H04B 17/13* (2015.01); *H01Q 1/002* (2013.01); *H01Q 3/34* (2013.01); *H01Q 23/00* (2013.01);
(Continued)

(58) Field of Classification Search
CPC ...................................................... H04B 17/13
See application file for complete search history.

(56) References Cited

U.S. PATENT DOCUMENTS 7,132,989 B1 11/2006 Poilasne
8,023,984 B2 9/2011 Jin et al.
(Continued)

FOREIGN PATENT DOCUMENTS

EP 3094020 B1 9/2019

*Primary Examiner* — Hsinchun Liao
(74) *Attorney, Agent, or Firm* — FLETCHER YODER PC

(57) ABSTRACT

A radio frequency device includes antennas, transmitters, power detectors, a memory storing instructions and an antenna gain lookup table, and processors. The processors execute instructions that include instructing the transmitters to send transmission signals through the antennas to form a first beamformed signal having a first beam direction and a first frequency using multiple input powers. The instructions include determining radio frequency integrated circuit (RFIC) gains associated with the transmitters based on the transmission signals using the power detectors. Moreover, the instructions include determining the antenna gains for the antennas based on the first beam direction and the first frequency of the first beamformed signal, and the antenna gain lookup table. The instructions also include determining total gains based on the RFIC gains and the antenna gains, and adjusting the input powers based on the total gains and a back off power signal.

20 Claims, 8 Drawing Sheets

Related U.S. Application Data

(60) Provisional application No. 63/062,132, filed on Aug. 6, 2020.

(51) Int. Cl.
  *H01Q 3/34* (2006.01)
  *H01Q 23/00* (2006.01)
  *H04B 17/10* (2015.01)
  *H04W 52/22* (2009.01)

(52) U.S. Cl.
  CPC ........ *H04B 17/102* (2015.01); *H04W 52/228* (2013.01)

(56) References Cited

U.S. PATENT DOCUMENTS

| | | |
|---|---|---|
| 8,971,948 B1 | 3/2015 | Breslin et al. |
| 9,603,105 B2 | 3/2017 | Yun |
| 10,153,731 B2 | 12/2018 | Thyagarajan et al. |
| 10,153,792 B2 | 12/2018 | Merlin |
| 2012/0252502 A1 | 10/2012 | Shiotsu et al. |
| 2013/0281036 A1 | 10/2013 | Kolokotronis |
| 2017/0331533 A1* | 11/2017 | Strong ................ H04L 25/0204 |
| 2019/0312359 A1 | 10/2019 | Madsen et al. |
| 2020/0044336 A1* | 2/2020 | Dani ....................... H03F 3/211 |
| 2020/0169004 A1 | 5/2020 | Zihir et al. |
| 2021/0258883 A1 | 8/2021 | Chiu et al. |
| 2021/0385764 A1 | 12/2021 | Pei et al. |

\* cited by examiner

RADIO FREQUENCY HANDSET CALIBRATION BASED ON ANTENNA GAIN

CROSS-REFERENCE TO RELATED APPLICATIONS

This application is a continuation of U.S. application Ser. No. 17/065,829, filed Oct. 8, 2020, entitled "RADIO FREQUENCY HANDSET CALIBRATION BASED ON ANTENNA GAIN," which claims benefit of U.S. Provisional Application No. 63/062,132, entitled "RADIO FREQUENCY HANDSET CALIBRATION BASED ON ANTENNA GAIN," filed Aug. 6, 2020, each of which is hereby incorporated by reference in its entirety for all purposes.

BACKGROUND

The present disclosure relates generally to wireless communication systems and devices and, more specifically, to determining power at an antenna of a radio frequency (RF) device when transmitting or receiving signals.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Radio frequency communication devices may include transmitters and receivers, which may be coupled together in a wireless communication device as a transceiver, to send and receive RF signals via one or more antennas. Many radio frequency devices are programmed to communicate signals at a target frequency or a target range of frequencies at a particular power. To ensure that signals are transmitted to their intended destinations and are received at a radio frequency device, the radio frequency device may increase input power at its transmitter(s) and receiver(s), respectively.

However, the increase in input power results in an increase in output power, or emitted radiation, at the one or more antennas of the radio frequency device. The Federal Communications Commission (FCC) has adopted guidelines for evaluating human exposure to radiation emitted from antennas, such as those used in radio frequency devices and base stations. In accordance to these guidelines, radio frequency devices, communication networks, and/or base stations may regulate the power transmitted from antennas of radio frequency devices, such as when a person is in close proximity to a radio frequency device, by sending a back off power signal to the radio frequency device that includes or is indicative of a maximum permissible exposure (MPE) requirement for radiated electric fields, magnetic fields, and power density. The MPE requirements are derived from a specific absorption rate (SAR) at which tissue absorbs radio frequency energy, usually expressed in watts per kilogram (W/kg). The regulations vary with frequency and the most stringent requirements are for the mmWave range, including 30 to 300 MHz, because various human-body resonances fall in this frequency range. Thus, when the radio frequency devices are within a particular distance from human contact, the radio frequency devices may receive back off power signals.

In particular, the radio frequency devices may receive a back off power signal indicating a power level that antennas should back off when transmitting or receiving signals. However, each antenna of a radio frequency device may operate differently from one another. That is, each antenna of the radio frequency device may output slightly different power than another antenna of the radio frequency device, despite receiving the same input power. This variance may be based on real-world imperfections or causes, such as differences in the radio frequency devices itself, manufacturing differences, device usage, environmental factors, interaction with other circuit components of the radio frequency device, and so forth.

When determining an amount of transmission or reception power to back off or attenuate, a radio frequency device may base the back off power amount on a radio frequency integrated circuit (RFIC) gain of the signal (e.g., a power of the signal prior to being received by antenna circuitry). By way of example, the RFIC gain may refer to a power of a transmission signal in the RFIC (e.g., after amplified by a power amplifier) prior to being sent by an antenna, or a power of a reception signal in the RFIC (e.g., after being received from the antenna). However, basing the back off power amount solely on an RFIC gain within the radio frequency device fails to account for any power gains at the antenna circuitry of the one or more antennas (e.g., antenna gain). Moreover, even if a uniform estimate antenna gain were to be applied to the RFIC gain to compensate for the antenna gain, because the antenna gain may vary from antenna to antenna in the radio frequency device, using such a uniform estimate antenna gain may result in inaccuracies or inefficiencies when backing off power.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a radio frequency device includes multiple antennas and multiple transmitters coupled to the multiple antennas, in which the multiple transmitters send respective transmission signals through the multiple antennas to form a beamformed signal. The radio frequency device also includes multiple power detectors coupled to the multiple transmitters, a memory that stores instructions and an antenna gain lookup table, and one or more processors coupled to the multiple transmitters, the multiple power detectors, and the memory. The antenna gain lookup table stores multiple antenna gains for the multiple antennas based on beam direction and frequency of the beamformed signal. The one or more processors executes the instructions, which cause the one or more processors to instruct the multiple transmitters to send the multiple transmission signals through the multiple antennas to form a first beamformed signal having a first beam direction at a first frequency using multiple input powers. The instructions also cause the one or more processors, in response to receiving a back off power, to determine multiple radio frequency integrated circuit gains associated with the multiple transmitters based on the multiple transmission signals using the multiple power detectors. Additionally, the instructions cause the one or more processors to determine the multiple antenna gains for the multiple antennas based on the first beam direction of the first beamformed signal, the first frequency of the first beamformed signal, and the antenna gain lookup table.

Moreover, in response to determining the multiple radio frequency integrated circuit gains and determining the multiple antenna gains, the instructions cause the one or more processors to determine multiple total transmission gains based on the multiple radio frequency integrated circuit gains and the multiple antenna gains. Furthermore, the instructions cause the one or more processors to adjust the multiple input powers based on the multiple total transmission gains and the back off power.

In another embodiment, a radio frequency device includes multiple antennas and multiple transmitters coupled to the multiple antennas, in which the multiple transmitters send multiple transmission signals through the multiple antennas to form a beamformed signal. The radio frequency device also includes one or more antenna gain lookup tables, each corresponding to a respective beam direction and/or a respective beam frequency, of a respective beamformed signal. Each of the one or more antenna gain lookup tables stores multiple antenna gains and multiple radio frequency integrated circuit gains corresponding to the respective beam direction and/or the respective beam frequency, of the respective beamformed signal.

In yet another embodiment, a method includes receiving multiple transmission signals from multiple antennas of an electronic device at multiple frequencies and at multiple angles of a beamformed signal measured in a near-field space using multiple sensors. The method also includes determining multiple power values of the multiple transmission signals. Moreover, the method includes determining multiple antenna gains for the multiple antennas based on the multiple power values. Additionally, the method includes sending the multiple antenna gains to be saved in a memory of the electronic device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
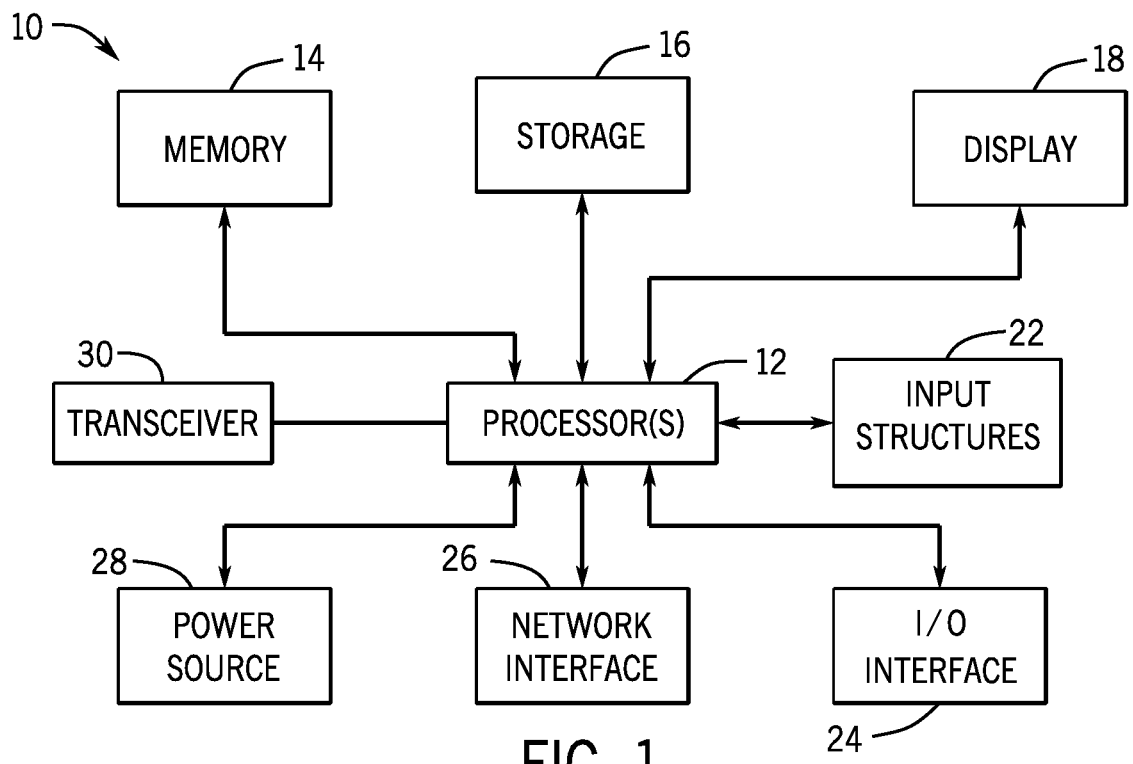
FIG. 1 is a block diagram of an electronic device, according to an embodiment of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment", "an embodiment", or "some embodiments" of the present disclosure are not intended to be interpreted as excluding the existence of additional embodiments that also incorporate the recited features. Use of the term "approximately" or "near" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

As used herein, "beamformed signal" may refer to a signal formed using beamforming techniques via multiple antennas. For example, transmission signals sent from an array of antennas may contribute to a signal (e.g., beamformed signal) directed in a particular direction communicated at a particular frequency. In particular, transmission signals at particular angles (e.g., in the particular direction) may experience constructive interference, while experiencing destructive interface at other angles (e.g., not in the particular direction). Also, as used herein, "antenna gain" may refer to a power increase or difference of a transmitted or received signal as measured at an antenna of a radio frequency device when compared to a power of the signal in the radio frequency device. By way of example, the antenna gain may include the gain provided by the antenna to a signal contributing to a beamformed signal communicated at a particular beam direction at a particular frequency after it has been amplified (e.g., by a power amplifier of a transmitter). The antenna gain may alternatively or additionally include the power of a signal received at the antenna. As such, the antenna gain may be measured at an antenna circuitry of a communication circuitry (e.g., a radio frequency handset). Also, as used herein, "radio frequency integrated circuit (RFIC) gain or power" may refer to a power gain provided by components of an RFIC circuitry to a transmission signal before it is sent to antenna circuitry or to a reception signal after it is received at the antenna. By way of example, the RFIC circuitry may include an amplifier (e.g., power amplifier), and the RFIC gain may include power gain provided by the amplifier to the transmission signal after the transmission signal has been amplified by the amplifier and before it is sent to the antenna. In additional or alternative embodiments, the RFIC gain may be the power of the transmission signal that has not been amplified by a power amplifier. As such, the RFIC gain may be measured at the RFIC circuitry (e.g., different circuitry than the antenna circuitry) of the radio frequency device.

As previously mentioned, one or more processors of a radio frequency device may instruct transceiver circuitry of the radio frequency device to adjust power of a transmission or reception signal, for example, based on receiving a back off power signal indicating a power level to limit power of the transmission or reception signal. In particular, the radio frequency device may receive a back off power signal based on a maximum permissible exposure (MPE) requirement or limit for radiated electric fields, magnetic fields, and/or power density. As previously mentioned, the MPE requirements are based on a specific absorption rate (SAR) at which tissue absorbs RF energy and may vary with frequency. Since human-body resonances fall within the millimeter wave (mmWave) frequency range, the radio frequency device may receive the back off power signal while communicating signals in this frequency range (e.g., when sending signals using beamforming techniques). Thus, when the radio frequency device is within a particular distance (e.g., an impermissible distance per MPE requirements) from human contact (e.g., while communicating signals on the mmWave), the radio frequency device may receive the back off power signal to ensure that the radiation emitted by the antenna does not harm the user of the device. By way of example, the radio frequency device may receive the back off power signal when the user is near the antenna, such as when the user's face or hand is moved to cover the antenna or into a threshold range of the antenna.

In this example, the radio frequency device may generate the back off power signal based on detecting (e.g., using device sensors) that the user is near or within the threshold range from the antenna. In some instances, a communication network communicatively coupled to the radio frequency device or a base station communicating with the radio frequency device may send the back off power signal to the radio frequency device. The back off power signal may include a total amount of radiation that the antenna may emit or that is permitted by the MPE requirements. However, the radio frequency device may not be capable of measuring or determining the power emitted at its own antenna (e.g., in real-time). Instead, the radio frequency device may determine the power in the signal prior to being emitted by the antenna (e.g., measured using a power detector in the radio frequency device after the signal is amplified by a power amplifier but prior to being sent to the antenna). This may be referred to as the radio frequency integrated circuit (RFIC) gain. Because there may be some gain of the signal at the antenna after being amplified by the power amplifier, the presently disclosed techniques include determining a total gain that includes both the RFIC gain and the antenna gain to compare to the back off power. In this manner, the radio frequency device may more accurately and efficiently transmit or receive signals at an increased or maximum power for greater signal range and better performance, while staying within FCC guidelines of specific absorption rate limits.

In particular, total gain (e.g., total transmission or total reception gain) corresponds to an effective or equivalent isotropically radiated power (EIRP), which refers to the maximum amount of power that may be radiated from an antenna. A near-field test system (e.g., chamber) that detects electrical or magnetic energy in a near-field distance (e.g., approximately directly around a device under test) may measure the total gain. In particular, the near-field test system includes multiple sensors in a near-field range from a radio frequency device that is under test, to measure the electrical energy (e.g., power) of transmission signals sent to (e.g., reception signals) or from (e.g., transmission signals) the antennas of the radio frequency device. By way of example, when transmitting signals, the transmission signals from each of the antennas may contribute to a beamformed signal transmitting in a particular direction at a particular frequency. Thus, the sensors may measure the power of the transmission signals at the antennas that contribute to the beamformed signal at the particular direction at the particular frequency. Additionally, power detectors in the RFIC circuitry of the radio frequency device, as previously described, may measure the RFIC gains of the transmission signals.

Since the antenna gains may not be measured during operation, the antenna gains may be determined using the measured total gains and the RFIC gains for each of the antennas, and then stored in the radio frequency device to be used during operation. The antenna gain may be determined as the difference between an RFIC gain and the total gain (e.g., antenna gain=total gain-RFIC gain). After determining the antenna gains, the radio frequency device may store this information in an antenna gain look up table. That is, the antenna gain lookup table for the particular beamformed signal transmitting in the particular direction at the particular frequency stores total transmission gains, RFIC gains, and/or antenna gains for the antennas contributing to the particular beamformed signal.

During operation and upon receiving a back off power signal indicating that the radio frequency device is not within a permissible range from a human, the radio frequency device may determine the antenna gains corresponding to the beamformed signal for the particular direction at the particular frequency as stored in the antenna gain lookup table. The radio frequency device may determine a difference between the total gains (e.g., sum of the RFIC gain and the antenna gain for each antenna) and the back off power signal for each of the antennas. Specifically, the radio frequency device may determine the RFIC gains using the power detectors and may receive the antenna gains from the antenna gain lookup table. In additional or alternative embodiments, the radio frequency device may receive RFIC gains stored in the antenna gain lookup table. In this manner, the radio frequency device may precisely and efficiently back off power in a single instance, step-down, adjustment, and/or iteration, of a signal from each of the antennas contributing to the beamformed signal. By way of example, the radio frequency device may reduce power of the respective transmission signals from an operating power level (e.g., 20 decibels (dB)) to the back off power level (e.g., 10 dB) without reducing to an intermediate power level (e.g., from the operating level (e.g., 20 dB) to the intermediate power level (e.g., 15 dB), and from the intermediate power level to the back off power level (e.g., 10 dB)). A similar process may be applied to the reception signals. With the foregoing in mind, there are many suitable communication devices, including those discussed in the following description that may adjust input power for transmitting and/or receiving signals to a particular power level and benefit from the disclosed embodiments for accurately determining total gain.

Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, a power source 28, and a transceiver 30. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
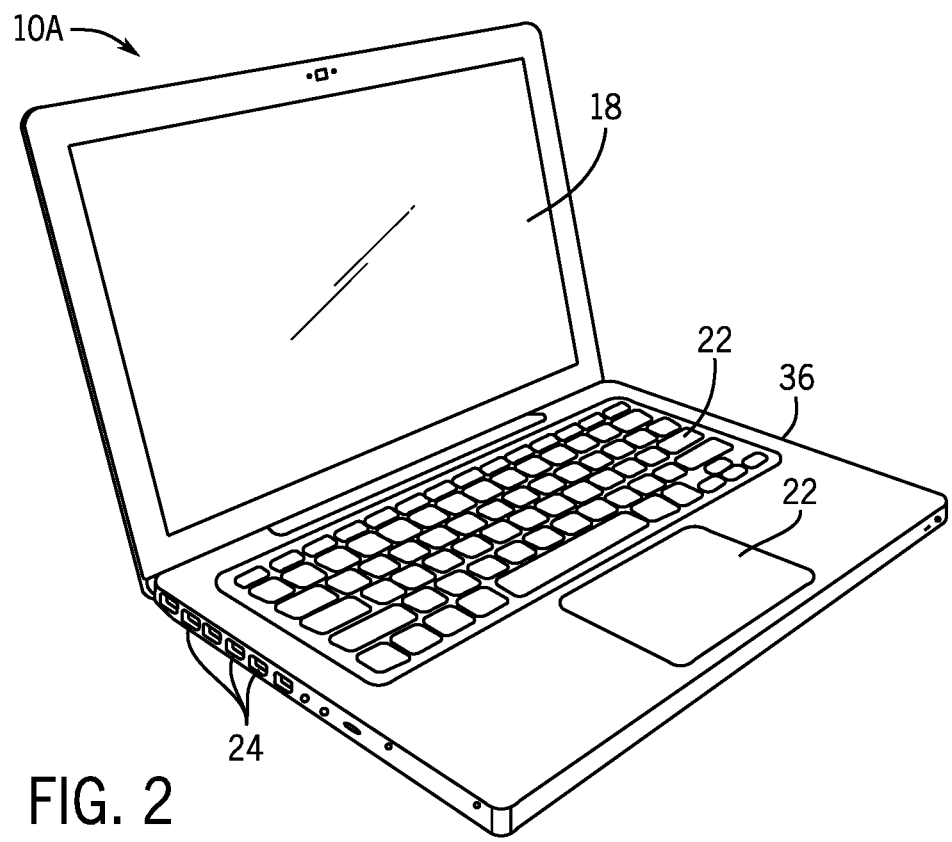
FIG. 2 is a perspective view of a notebook computer representing an embodiment of the electronic device of FIG. 1.
Figure 4:
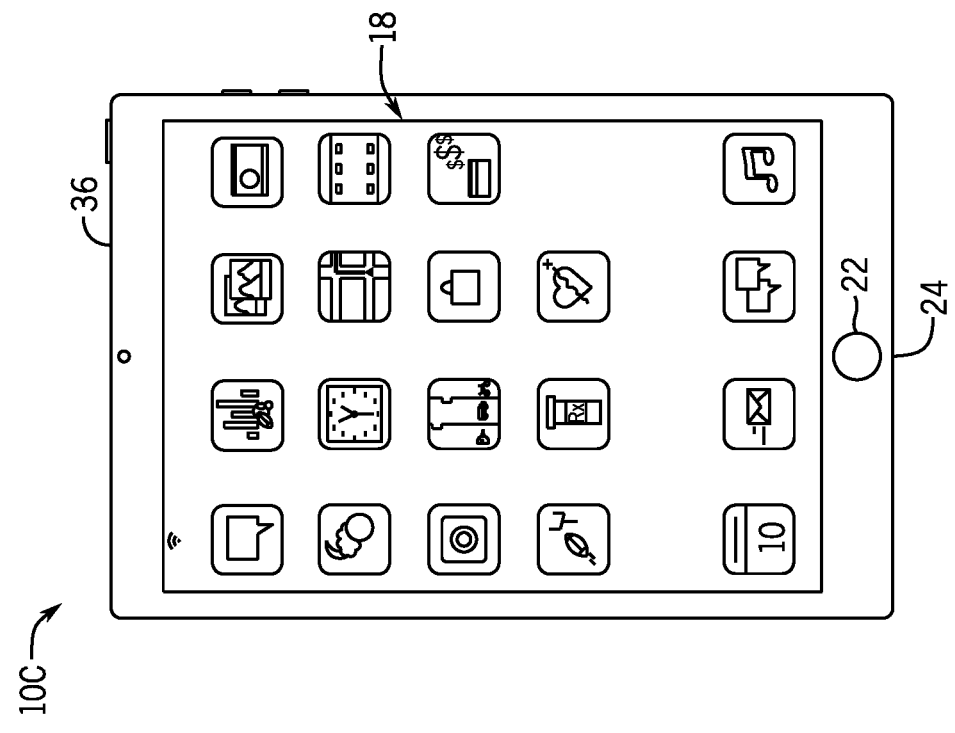
FIG. 4 is a front view of another handheld device representing another embodiment of the electronic device of FIG. 1.
Figure 3:
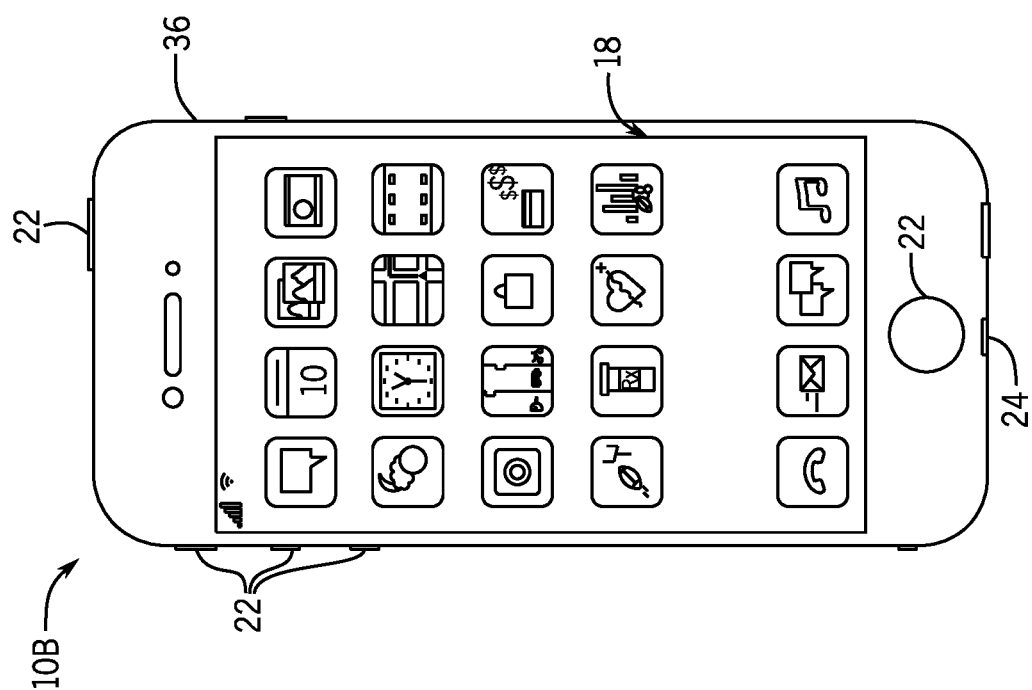
FIG. 3 is a front view of a handheld device representing another embodiment of the electronic device of FIG. 1.
Figure 5:
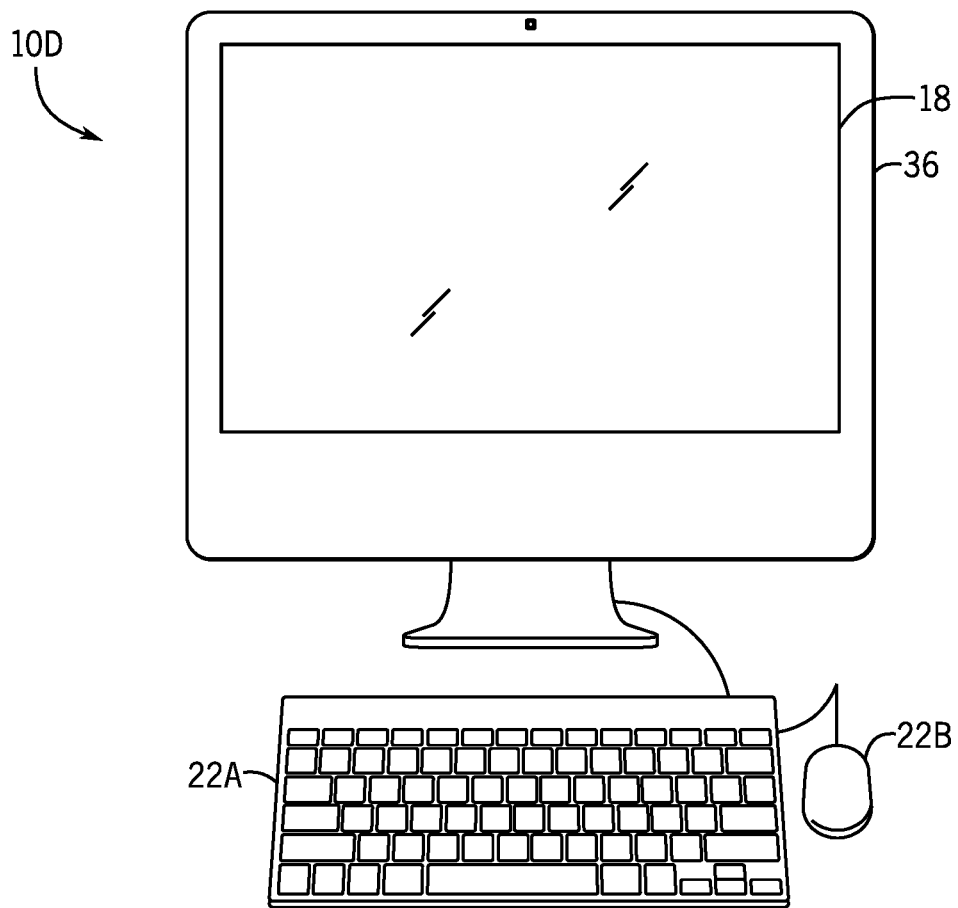
FIG. 5 is a front view of a desktop computer representing another embodiment of the electronic device of FIG. 1.
Figure 6:
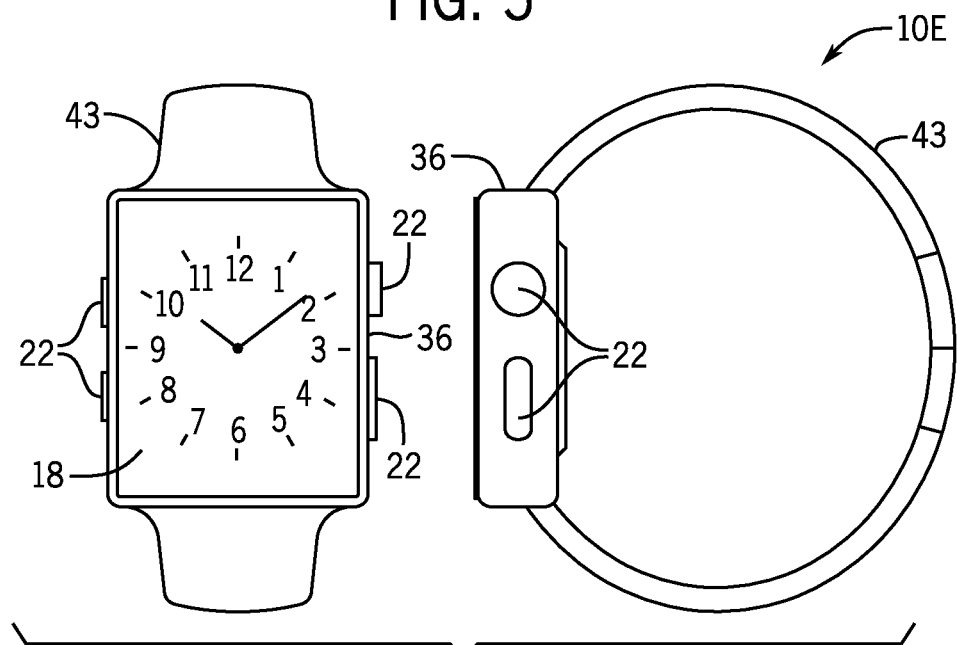
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, hardware, or any combination thereof. Furthermore, the processor(s) 12 and other related items in FIG. 1 may be a single contained processing module or may be incorporated wholly or partially within any of the other elements within the electronic device 10.

In the electronic device 10 of FIG. 1, the processor(s) 12 may be operably coupled with a memory 14 and a nonvolatile storage 16 to perform various algorithms. For example, algorithms for adjusting input/output power of antennas may be saved in the memory 14 and/or nonvolatile storage 16. Such algorithms or instructions executed by the processor(s) 12 may be stored in any suitable article of manufacture that includes one or more tangible, computer-readable media. Moreover, antenna gain lookup tables used for determining total transmission gains and/or total reception gains may be saved in the memory 14 and/or nonvolatile storage 16. Specifically, one or more antenna gain lookup tables may be stored in the memory 14 and/or nonvolatile storage 16, in which each of the antenna gain lookup tables correspond to a particular beam direction at a particular frequency for signals emitted by multiple antennas using beamforming techniques. The tangible, computer-readable media may include the memory 14 and/or the nonvolatile storage 16, individually or collectively, to store the algorithms or instructions. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network. In particular, the network interface 26 may include, for example, one or more interfaces for using a Release-15 cellular communication standard of the 5G specifications that include the millimeter wave (mm Wave) frequency range (e.g., 30-300 GHz). The transceiver 30 of the electronic device 10, which includes the transmitter and the receiver, may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-TR) network and its extension DVB Handheld (DVB-H®) network, ultra-wideband (UWB) network, alternating current (AC) power lines, and so forth.

In some embodiments, the electronic device 10 communicates over the aforementioned wireless networks (e.g., WI-FI®, WIMAX®, mobile WIMAX®, 4G, LTE®, 5G, and so forth) using the transceiver 30. The transceiver 30 may include circuitry useful in both wirelessly receiving the reception signals at the receiver and wirelessly transmitting the transmission signals from the transmitter (e.g., data signals, wireless data signals, wireless carrier signals, radio frequency RF signals). Indeed, in some embodiments, the transceiver 30 may include the transmitter and the receiver combined into a single unit, or, in other embodiments, the transceiver 30 may include the transmitter separate from the receiver. The transceiver 30 may transmit and receive radio frequency signals to support voice and/or data communication in wireless applications such as, for example, PAN networks (e.g., BLUETOOTH®), WLAN networks (e.g., 802.11x WI-FI®), WAN networks (e.g., 3G, 4G, 5G, NR, and LTE® and LTE-LAA cellular networks), WIMAX® networks, mobile WIMAX® networks, ADSL and VDSL networks, DVB-T® and DVB-HR networks, UWB networks, and so forth. As further illustrated, the electronic device 10 may include the power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers), or generally used in one place (such as desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, California. By way of example, the electronic device 10, taking the form of a notebook computer 10A, is illustrated in FIG. 2 in accordance with one embodiment of the present disclosure. The depicted notebook computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a graphical user interface (GUI) and/or applications running on computer 10A. For example, a keyboard and/or touchpad may allow a user to navigate a user interface and/or an application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPhone® available from Apple Inc. of Cupertino, California. The handheld device 10B may include an enclosure 36 to protect interior components from physical damage and/or to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc. of Cupertino, California, a universal serial bus (USB), or other similar connector and protocol.

The input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone that may obtain a user's voice for various voice-related features, and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. of Cupertino, California. It should be noted that the computer 10D may also represent a personal computer (PC) by another manufacturer. A similar enclosure 36 may be provided to protect and enclose internal components of the computer 10D, such as the display 18. In certain embodiments, a user of the computer 10D may interact with the computer 10D using various peripheral input structures 22, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. of Cupertino, California. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, LED display, OLED display, active-matrix organic light emitting diode (AMOLED) display, and so forth), as well as input structures 22, which may allow users to interact with a user interface of the wearable electronic device 10E.

Figure 7:
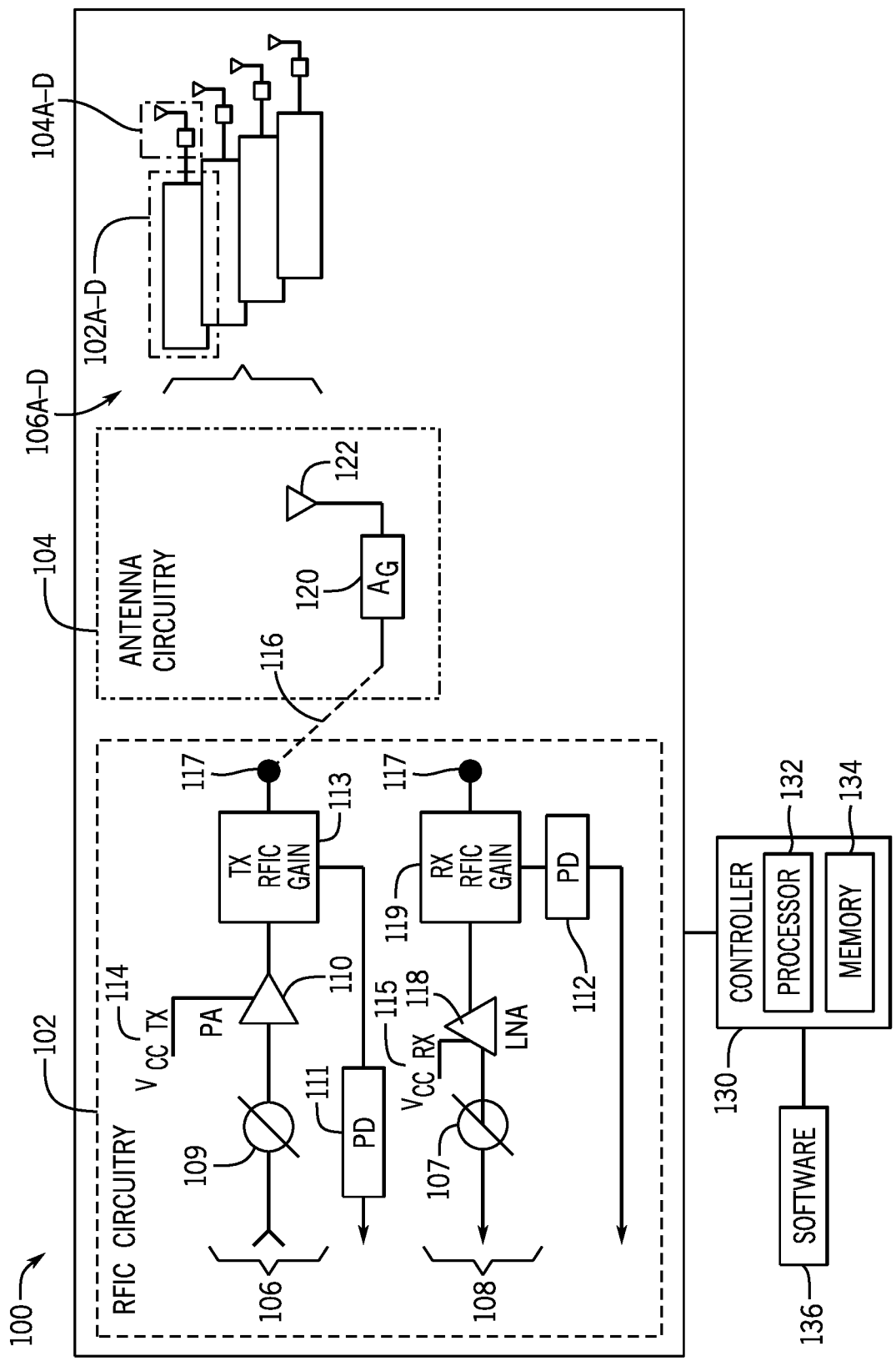
FIG. 7 is a schematic diagram of the electronic device of FIG. 1 in the form of a communication circuitry, according to embodiments of the present disclosure.

With the foregoing in mind, FIG. 7 is schematic diagram of the electronic device 10 of FIG. 1 in the form of a communication circuitry 100, according to embodiments of the present disclosure. In some embodiments, the communication circuitry 100 may communicate with, be coupled to, or be integrated into the transceiver 30 of the electronic device 10 to facilitate transmitting and receiving signals. The communication circuitry 100 may include a controller 130 (e.g., a network controller) having one or more processors 132 (e.g., which may include the processor 12 illustrated in FIG. 1) and one or more memory and/or storage devices 134 (e.g., which may include the memory 14 and/or the nonvolatile storage 16 device illustrated in FIG. 1). The one or more processors 132 may include multiple microprocessors, one or more "general-purpose" microprocessors, one or more special-purpose microprocessors, and/or one or more application specific integrated circuits (ASICS), or some combination thereof. For example, the one or more processors 132 may include one or more reduced instruction set (RISC) processors. Moreover, the one or more processors 132 may execute software programs and/or instructions to receive or generate a back off power signal, look up an antenna gain for a particular antenna used to transmit or receive signals contributing to a beamformed signal in a particular beam direction at a particular frequency, determine radio frequency integrated circuit (RFIC) gain for a particular transmitter and/or receiver chain associated with the particular antenna, determine total transmission and/or reception gain for the particular transmitter and/or receiver chain, adjust input power based on the back off power signal and the total transmission and/or reception gain, and so on.

The one or more memory devices 134 may store information such as control software, look up indexes (e.g., one or more antenna gain lookup tables), configuration data, etc. In some embodiments, the one or more processors 132 and/or the one or more memory devices 134 may be external to the controller 130 and/or the communication circuitry 100. The one or more memory devices 134 may include a tangible, non-transitory, machine-readable-medium, such as a volatile memory (e.g., a random access memory (RAM)) and/or a nonvolatile memory (e.g., a read-only memory (ROM)). The one or more memory devices 134 may store a variety of information and may be used for various purposes. For example, the one or more memory devices 134 may store machine-readable and/or processor-executable instructions (e.g., in the form of software or a computer program) for the one or more processors 132 to execute, such as instructions for looking up the antenna gain for the particular antenna transmitting or receiving signals contributing to the beamformed signal transmitted or received in the particular beam direction at the particular frequency, determining RFIC gain for the particular transmitter and/or receiver chain associated with the particular antenna, determining total transmission and/or reception gain, adjusting input and/or output power based on the back off power signal and the total transmission and/or reception gain, and so on. The one or more memory devices 134 may include one or more storage devices (e.g., nonvolatile storage devices) that may include read-only memory (ROM), flash memory, a hard drive, or any other suitable optical, magnetic, or solid-state storage medium, or a combination thereof.

The controller 130 may be electrically or communicatively coupled to the communication circuitry 100. As shown, the communication circuitry 100 includes radio frequency integrated circuit (RFIC) circuitry 102 and antenna circuitry 104. In general, the RFIC circuitry 102 includes transmitter chains 106 and receiver chains 108. Although the following descriptions describe a single transmitter chain 106 that may output a transmission signal to contribute (along with other transmitter chains 106) to a beamformed transmitted signal, and a single receiver chain 108, it should be noted that the methods and systems described may be performed and/or implemented with multiple RFIC circuitries 102 (e.g., 102A-D) having multiple transmitter chains 106 (e.g., 106A-D) and multiple receiver chains 108 (e.g., 108), as well as multiple antenna circuitries 104D (e.g., 104A-D) coupled to multiple antennas 122.

As previously discussed, determining a total gain, such as a total transmission gain or a total reception gain for transmitting a transmission signal contributing to the beamformed signal or receiving a reception signal, may be beneficial for accurately and efficiently adjusting input power (e.g., for the transmission or the reception signal). Determining the total transmission gain or the total reception gain may include determining both an RFIC gain and an antenna gain. By way of example, when sending the transmission signal, the RFIC gain may be measured at the RFIC circuitry 102 and correspond to the power or gain of a transmission signal at the RFIC circuitry 102 before it reaches the antenna circuitry 104. In some cases, the RFIC gain for the transmission signal may include the gain provided to the transmission signal from one or more power amplifiers in the transmitter chain 106. The antenna gain may be measured at the antenna circuitry 104 and correspond to gain provided by an antenna when sending the transmission signal.

The transmitter chain 106 and the receiver chain 108 may include components that facilitate transmission and reception of wireless signals, such as those sent and received between devices 10 using mmWave communication technology or any other suitable communication protocol. When communicating on the mmWave frequencies, an electronic device 10 may utilize beamforming techniques. Briefly, the transmitter chain 106 of the RFIC circuitry 102 may include multiple electronic components, such as a transmitter phase shifter 109, a power amplifier (PA) 110, and a transmitter power detector (PD) 111. A transmitter RFIC gain 113 may be measured at the transmitter chain 106 (e.g., on a transmission line) between the PA 110 and the antenna circuitry 104 with an antenna 122. Accordingly, the transmitter RFIC gain 113 includes a power gain applied to the transmission signal prior to sending it to the antenna circuitry 104. A transmission/reception switch 116 may selectively couple the antenna circuitry 104 with the antenna 122 to either the transmitter chain 106 or the receiver chain 108 (e.g., at node 117 of the transmission or receiver chain 106, 108), such that the antenna circuitry 104 sends the transmission signals when coupled to the transmitter chain 106 or receives the reception signals when coupled to the receiver chain 108.

Although the following descriptions describe the antenna 122 as either transmitting the transmission signal or receiving the reception signal (e.g., via switch 116), the systems and methods described herein may also include the same antenna 122 for simultaneously transmitting the transmission signal and receiving the reception signal (e.g., in a full duplex mode).

Briefly, the receiver chain 108 includes a receiver phase shifter 107, a low noise amplifier (LNA) 118, and a receiver power detector (PD) 112. A receiver RFIC gain may be measured at the receiver chain 108 (e.g., on a reception line) between the LNA 118 and the antenna circuitry 104. Accordingly, the receiver RFIC gain includes a power gain applied to the reception signal after the reception signal is received at the antenna circuitry 104 and before the reception signal is sent to the LNA 118. Additional components in the transmitter chain 106 and/or the receiver chain 108 may include, but are not limited to, filters, mixers, and/or attenuators. These components may be tuned based on environmental conditions (e.g., expected noise), type of signal, device type, target gain for transmitting the transmission signal and receiving the reception signal, and so forth.

The transmitter phase shifter 109 may modulate (e.g., phase-shift) the transmission signal and may work with other transmitter phase shifters 109 of other transmitter chains 106 to form a beam that may be steered in a particular direction, such as towards another electronic device (e.g., an electronic device 10, a base station). The PA 110 may be supplied with a power amplifier supply voltage 114 to control the amount of amplification provided by the PA 110 (e.g., increase or decrease amplification, which may affect the antenna gain at the corresponding antenna 122). The transmitter PD 111 may measure power of a transmission signal in the transmitter chain 106. In particular, the transmitter PD 111 may measure the transmitter RFIC gain 113 (e.g., at the transmission chain 106 between the PA 110 and the antenna circuitry 104 with the antenna 122) of the transmission signal as a result of being amplified. By way of example, the transmitter RFIC gain 113 may include the power gain or amplification provided by the PA 110.

The antenna circuitry 104 includes the antenna 122. A transmitter antenna gain 120 may be measured at or near the antenna 122 using sensors as will be described in detail in FIG. 8. Specifically, one or more sensors external to the communication circuitry 100 may detect the transmitter antenna gain 120 of the transmission signal as emitted by the antenna 122. Similarly, the one or more sensors may detect the receiver antenna gain 119 of a reception signal when they are received by the antenna 122.

During operation of the radio frequency device 10, the controller 130 may control the communication circuitry 100 based on instructions in the form of software 136. In particular, the software 136 may include instructions to update, add, and/or remove present configurations of the communication circuitry 100. For example, the configurations may include, but may not be limited to, the settings for the particular components (e.g., phase shifters 107, 109 and/or amplification provided by the PA 110 and/or the LNA 118) of the transmitter chain 106 and/or the chain 108, based on the back off power signal. As such, and as will be described in detail with respect to FIG. 11, the software 136 may also include an algorithm to reference the antenna gain lookup table for the transmitter antenna gain 120 associated with the antennas 122, and in some instances, subsequently adjust the input powers to the antennas 122 based on the total transmission gain and the back off power amount as indicated by the back off power signal. Similar algorithms may be applied for the reception signals. By way of example, the software 136 may also include an algorithm to adjust the amount of amplification provided to reception signals. In particular, the algorithm may control a low noise amplifier voltage 115 to control the amount of amplification provided by the LNA 118 (e.g., increase or decrease amplification of a reception signal).

Figure 8:
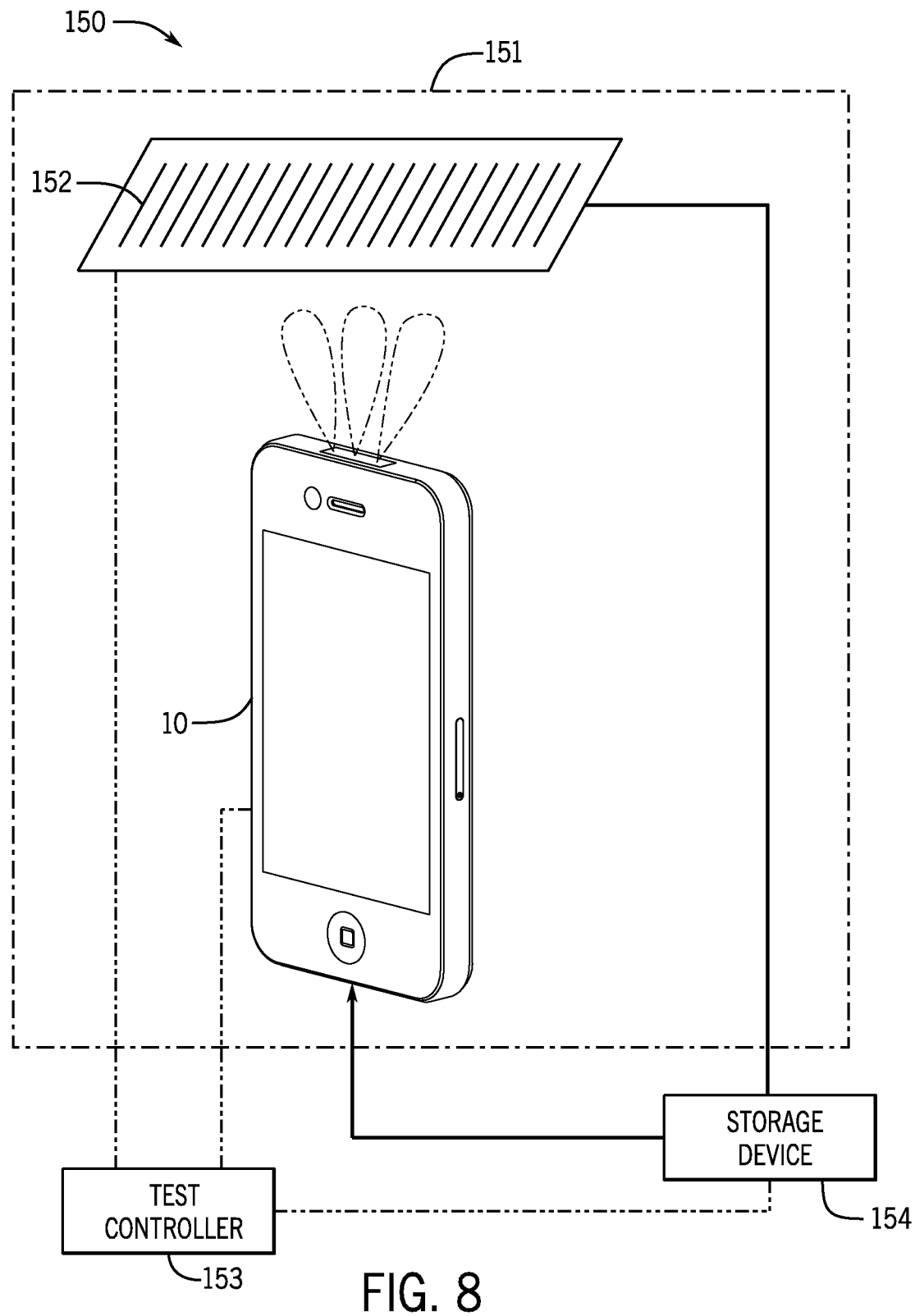
FIG. 8 is a block diagram of near-field test system for determining antenna gains of antennas of the communication circuitry of FIG. 7, according to embodiments of the present disclosure.

To illustrate determining the transmitter antenna gain 120 and/or the receiver antenna gain 120, FIG. 8 depicts a block diagram of near-field test system 150 for determining the antenna gains 120 of the antennas 122 of the electronic device 10 of FIG. 7, according to embodiments of the present disclosure. As shown, the near-field test system 150 includes a test chamber 151. In some embodiments, the test chamber 151 is an example of the near-field test system 150, such that the test devices and components of the near-field test system 150 are located inside of the test chamber 151 (e.g., a room in which the near-field testing is performed). The near-field test system 150 includes an array of sensors 152, the electronic device 10 as a device under test, and a storage device 154 (associated with the electronic device 10). The near-field test system 150 also includes a test controller 153 (having one or more processors 12 and one or more memory devices 14) that is electrically or communicatively coupled to the electronic device 10, the array of sensors 152, and the storage device 154. The test controller 153 may control devices and components (e.g., cause the electronic device 10 to send transmission signals from the antennas 122, cause the array of sensors 152 to measure power of the transmission signals, etc.) to determine the transmitter antenna and/or the receiver antenna gain 120 using the near-field test system 150. In general, these near-field antenna measurements may be performed during a manufacturing or device production process. A signal from the transmitter chain 106 is sent by the antenna 122 (e.g., as part of a beamformed signal) into free space in the form of electromagnetic (EM) waves. Portions of the EM waves that are close to the antenna 122 (e.g., near-field) have non-radiative behaviors while portions of the EM waves further from the antenna 122 (e.g., far-field) have radiative behaviors. Measuring the EM waves at a near-field distance in a manufacturing process may be more efficient and less time-consuming than performing far-field measurements for devices, because the array of sensors 152 is placed relatively closer to the electronic device 10 to perform the near-field measurements compared to far-field measurements, thus enabling smaller testing facilities and quicker signal reception and measurement. The near-field measurements may be subsequently used to accurately estimate far-field pattern measurements.

As shown, the array of sensors 152 (e.g., near-field communication sensor) may be disposed at a particular distance (e.g., suitable distance to measure near-field) from the electronic device 10 and may detect the EM waves around the electronic device 10. As previously mentioned, the electronic device 10 may include multiple antennas 122. As such, when the electronic device 10 transmits transmission signals (e.g., collectively as a beamformed signal), the array of sensors 152 may measure the RF power (e.g., EIRP values) of the transmission signals being transmitted from each transmitter antenna 122. A similar process may be performed with respect to the multiple receiver antennas 122 when the electronic device 10 receives the reception signals. In some embodiments, the near-field test system 150 for the reception signals may include an additional electronic device 10 that is transmitting the reception signals to the electronic device 10 under test. Multiple sensors of the electronic device 10 under test may be in a near-field distance from the reception signals to measure power at the receiver antennas 122 when the electronic device 10 receives the reception signals.

As will be described with respect to FIG. 9, the near-field test system 150 may measure characteristics of the beamformed transmission signals. That is, the array of sensors 152 may measure the RF power from each antenna 122 (e.g., the total transmission gain) in each beamformed direction (e.g., beamformed angle) in the near-field space at different frequencies. The total transmission gain, for each antenna 122, in each beamformed direction, at each frequency, may be stored in the storage device 154 associated with the electronic device 10 (e.g., the memory device 134 of FIG. 7 and/or the memory 14 of FIG. 1) with an indication of the particular direction and/or the particular frequency of the corresponding beamformed signal. That is, as discussed above, the total transmission gain includes the transmitter RFIC gain 113 and the transmitter antenna gain 120. In some embodiments, instead of or in addition to storing the total transmission gain, the processor 132 (or processor 12 of FIG. 1) may determine the transmitter antenna gain 120 by determining the difference of the transmitter RFIC gain 113 from the total transmission gain (e.g., transmitter antenna gain=total transmission gain-transmitter RFIC gain). Similar measurements may be performed for the reception signals and stored in the storage device 154 and/or determined by the processor 132.

Figure 9:
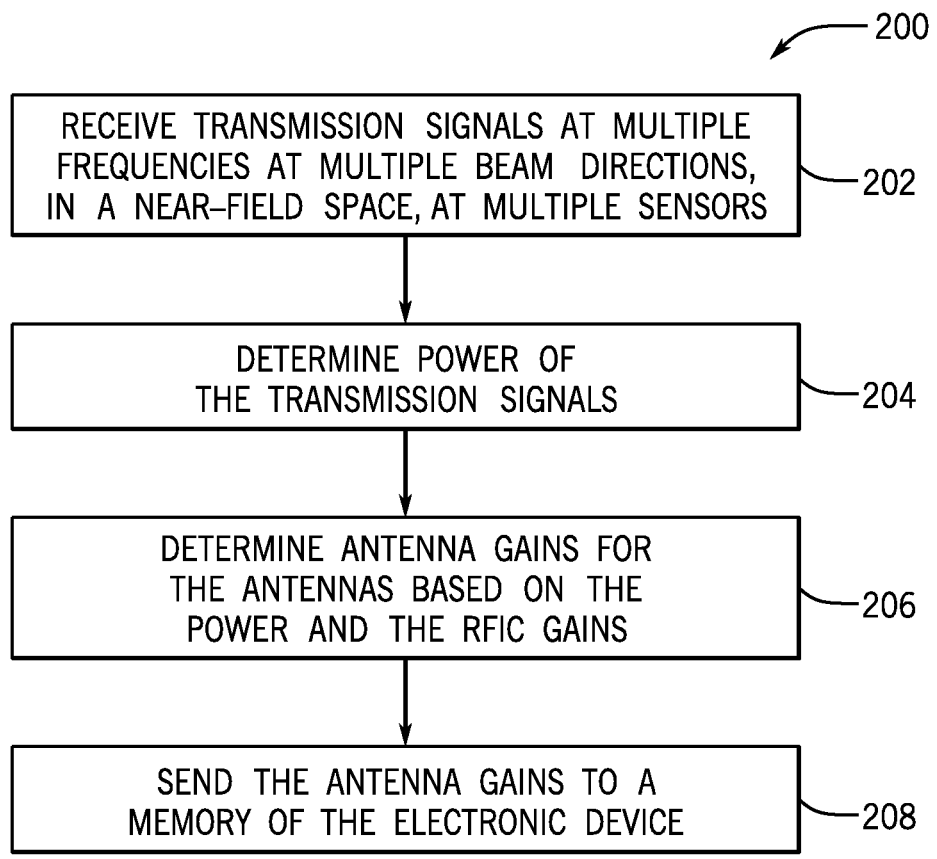
FIG. 9 is a flowchart illustrating a method for determining the antenna gains using the near-field test system of FIG. 8, according to embodiments of the present disclosure.

FIG. 9 depicts a flowchart illustrating a method 200 for determining the transmitter antenna gains 120 and/or receiver antenna gains using the near-field test system 150 of FIG. 8 during, for example, the manufacturing process, according to embodiments of the present disclosure. Any suitable testing device or set of testing devices, such as the test controller 153 that may control components of the near-field test system 150 (e.g., the array of sensors 152), may perform the method 200. In some embodiments, the method 200 may be implemented by executing instructions stored in a tangible, non-transitory, computer-readable medium, such as the one or more memory devices 14, using a processor, such as the one or more processors 12. The processor 12 of the test controller 153 that controls the near-field test system 150 may execute instructions that are stored (e.g., in memory 14) to perform the method 200 and carried out by the controller 153 and test components. While the method 200 is described using steps in a specific sequence, it should be understood that the present disclosure contemplates that the described steps may be performed in different sequences than the sequence illustrated, and certain described steps may be skipped or not performed altogether. Although the following discussion describes the method 200 performed with respect to transmission, the method 200 may additionally or alternatively be implemented in a similar manner for reception.

At process block 202, the array of sensors 152 (e.g., multiple sensors) receives transmission signals from the antennas 122 of the electronic device 10, at multiple frequencies at multiple beam directions, in a near-field space. In particular, each of the transmitter antennas 122 of the transmitter chains 106 may radiate transmission signals contributing to a beamformed signal in a particular direction at a particular frequency. That is, the electronic device 10 causes the signals from the multiple antennas 122 to form a beam having the particular direction. The test controller 153 may measure the shape of the beamformed transmission signals.

As such, at process block 204, the test controller determines power of the transmission signals. That is, the array of sensors 152 may measure the RF power of each of the transmission signals that form the beamformed transmission signal in multiple directions (e.g., directed at multiple points in near-field space). By way of example, the array of sensors 152 may measure power of the transmission signals contributing to the beamformed transmission signal in a first direction, second direction, a third direction, and so forth. Similarly, the array of sensors 152 may measure the RF power of the transmission signals contributing to the beamformed transmission signal at a particular frequency, and then measure the RF power of the transmission signals contributing to the beamformed transmission signals at multiple frequencies within a desired frequency range (e.g., range of frequencies of a mmWave). Thus, the method 200 includes measuring the RF power of multiple transmission signals radiating from the transmitter antennas 122 that form beamformed signals having multiple frequencies at multiple directions in the near-field space. By way of example, the multiple directions may include beamformed directions ranging from −45° to 45° at 5° increments. By way of another example, the multiple frequencies may include beamformed frequencies ranging 30 MHz to 300 MHz at 20 MHz increments.

Figure 10:
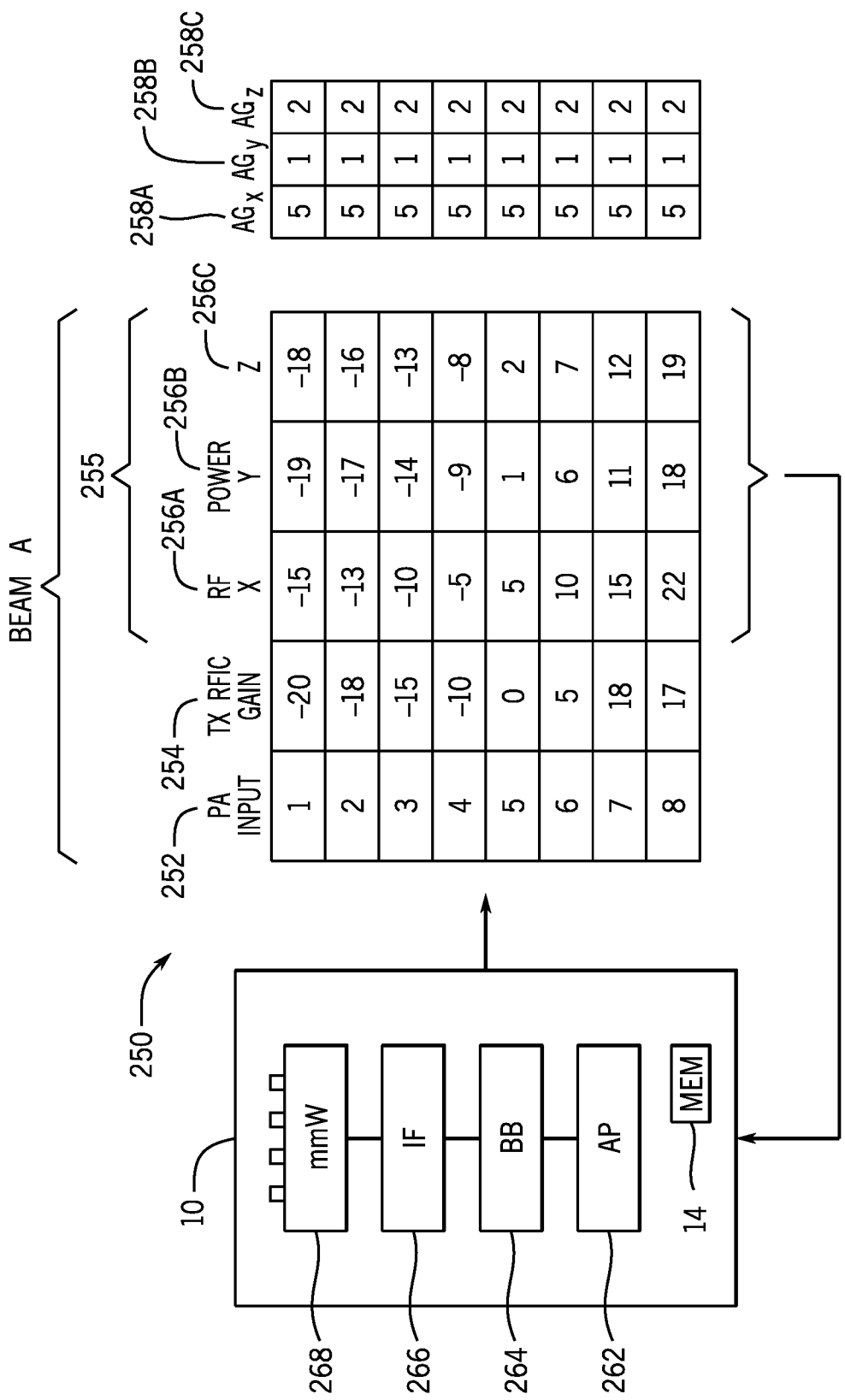
FIG. 10 is a block diagram of an antenna gain lookup table with the antenna gains, according to embodiments of the present disclosure.

Next, at process block 206, the test controller 153 determines transmitter antenna gains 120 for the transmitter antennas 122 based on the power and the transmitter RFIC gains 113. To illustrate, FIG. 10 depicts an antenna gain lookup table 250 stored in the memory 14 of the electronic device 10, according to embodiments of the present disclosure. As shown, the antenna gain lookup table 250 includes multiple parameters and corresponding measurements relevant to transmitter antenna gains 120. Although the following discussions describe particular parameters corresponding to transmitter antennas 122 of three mmWave electronic devices 10 (e.g., mmWave devices X, Y, and Z), the antenna gain lookup table 250 may include data for any suitable number of parameters corresponding to any suitable number of transmitter antennas 122 of any suitable number of electronic devices 10. The antenna gain lookup tables 250 may store these parameters for multiple different electronic devices 10, such as the mmWave devices X, Y, and Z. By way of example, these electronic devices 10 may be the same device type and as such, may have the same or similar input components, such that their transmitter RFIC gains 113 may be the same. However, due to device imperfections, manufacturing differences, and other fabrication differences, the transmitter antenna gains 120 may be different for the same antennas 122 (e.g., a first antenna 122 for each of the mm Wave devices X, Y, and Z). The mm Wave devices X, Y, and Z may each include or correspond to a device identifier, such as a device identification number, a serial number, or another manufacturer identifier, which may be used to distinguish the mmWave devices.

Moreover, although the following discussions describe the antenna gain lookup table 250 with respect to the transmitter (e.g., the transmitter chain 106, the antenna 122, the transmitter antenna gain 120, etc.), a similar antenna gain lookup table 250 may be generated for the receiver of the electronic device 10 (e.g., the receiver chain 108, the antenna 122, the receiver antenna gain 120, etc.) and stored in the memory 14.

The depicted antenna gain lookup table 250 corresponds to a first beamformed transmission signal, Beam A, having a first frequency in a first direction, as emitted (in part) by a particular antenna 122. As shown, the antenna gain lookup table 250 is includes a power amplifier (PA) input 252 parameter, an RFIC gain 254 parameter, a RF power 255 (e.g., total transmission power) parameter, and a transmitter antenna gain 258 parameter corresponding to the particular antenna 122. The antenna gain lookup table 250 may be indexed using any of these parameters. In particular, to meet a power level of the back off power signal, the antenna gain lookup table 250 may at least be indexed by the RF power 255 parameter to enable quicker and more efficient searching of the greatest RF power 255 that does not exceed the power level of the back off power signal. The RF power 255 refers to a total transmission gain of the transmission signals for Beam A having the first frequency in the first direction, in which the RF total transmission gain of the transmission signals refers to: a RF power X (e.g., a total transmission gain X) 256A of a transmission signal sent from the particular antenna 122 of a first mmWave device X (e.g., a first electronic device 10), a RF power Y (e.g., a total transmission gain Y) 256B of a transmission signal sent from the particular antenna 122 of a second mmWave device Y (e.g., a second electronic device 10), and a RF power Z (e.g., a total transmission gain Z) 256C of a transmission signal sent from the particular antenna 122 of a third mmWave device Z (e.g., a third electronic device 10). The RF power 255 may be determined using the near-field test system 150 of FIG. 8. The transmitter antenna gain 258 includes an antenna gain X 258A for the particular antenna 122 of the first mmWave device X, an antenna gain Y 258B for the particular antenna 122 of the second mmWave device Y, and an antenna gain Z 258C for the particular antenna 122 of the third mmWave device Z.

The first row of the antenna gain lookup table 250 corresponds to a first PA input 252 (e.g., PA input 1) of a first transmitter chain 106 for a transmission signal contributing to Beam A (e.g., beamformed signal) having the first frequency and directed in the first direction. The first PA input 252 may correspond to the power amplifier supply voltage 114. The first row also provides the RFIC gain 254, the RF power 255, and the transmitter antenna gain 258 for the first transmitter chain 106. As previously discussed, the transmitter RFIC gain 254 (e.g., transmitter RFIC gain 113 of FIG. 7) is measured at the transmitter chain 106 after the PA 110 and before the antenna circuitry 104 (e.g., at the RFIC circuitry 102), while the transmitter antenna gain 258 (e.g., transmitter antenna gain 120 of FIG. 7) is measured at the antenna 122 (e.g., at the antenna circuitry 104 and based on radiation emitted from the antenna 122, as described in detail with respect to FIG. 8).

Specifically, a transmitter PD 111 of a mmWave device (e.g., the first mmWave device X) may measure or sense a transmitter RFIC gain 254 of a transmission signal in a first transmitter chain 106 for a transmission signal contributing to Beam A (e.g., in the first direction at the first frequency) at a first PA 110 input or supply voltage (e.g., PA input 1) of the PA input 252. This transmitter RFIC gain 254 may be determined on the first transmitter chain 106 after the transmission signal is sent through the PA 110 and before the antenna circuitry 104. In the depicted embodiment, the transmitter RFIC gain 254 is −20 dB.

The transmitter antenna gain 258A may be determined using the RF power X 256A. As previously mentioned, to determine the transmitter antenna gain 258A for the mmWave device X, the array of sensors 152 of the near-field test system 150 of FIG. 8 may measure the RF power X 256A for a transmission signal from the first transmitter chain 106 contributing to Beam A using the method 200 described with respect to FIG. 8. As shown, the RF power X 256A is −15 dB. The total transmission gain (e.g., RF power) may be described by the following equation:

$$RF\ Power = RFIC\ gain + Antenna\ gain \quad \text{(Equation 1)}$$

Upon manipulating Equation 1 for the antenna gain, the antenna gain may be described by the following equation:

$$Antenna\ gain = RF\ Power - RFIC\ gain \quad \text{(Equation 2)}$$

Both the transmitter RFIC gain 254 and RF power X 256A (e.g., total transmission gain) are known measured values. In particular, the transmitter RFIC gain is −20 dB and the RF power X 256A is −15 dB. The difference between the RF power X 256A (e.g., −15 dB) and the transmitter RFIC gain 254 (e.g., −20) provides the corresponding antenna gain X 258A. Thus, the antenna gain 258A is 5 dB. That is, for the first PA 110 as the PA input 252 of the first transmitter chain 106 for a transmission signal contributing to beam A in the first direction at the first frequency, the RFIC gain 254 is −20 dB, the RF power X 256A is −15 dB, and the corresponding antenna gain X 258A is 5 dB. Similar measurements may be performed to determine the RF power Y 256B for a transmission signal contributing to Beam A in the first direction at the first frequency for the antenna 122 in the first transmitter chain 106 of the mmWave device Y, and for the RF power Z 256C for the antenna 122 in the first transmitter chain 106 of the mmWave device Z. The antenna gains 258B and 258C may be determined in a similar manner. Furthermore, the test controller may perform similar measurements and determinations for each of the other PA input 252 (e.g., PA input 2-8) in the electronic device 10 (e.g., PA 110 for the second through eighth transmitter chain 106). Additionally, the memory 14 may store additional antenna gain lookup tables 250 that correspond to transmission signals that contribute to beamformed signals in other beam directions (e.g., other than the direction of Beam A) and/or at other frequencies.

Turning back to FIG. 9, at process block 208, the test controller 153 sends the transmitter antenna gains 120 to a memory 14 of the electronic device 10 after the test controller determines the transmitter antenna gains 120. The transmitter antenna gains 120 are saved in the memory 14 of the electronic device 10. In this manner, the electronic device 10 may retrieve or look up the transmitter antenna gains 120 during operation (e.g., after the manufacturing process, while in use by a consumer). For example, and as will be described herein, the communication circuitry 100 may adjust power of the transmission signal in response to receiving the back off power signal when the antenna 122 of the electronic device 10 is not within a permissible range from a human. Similar process blocks may correspond to receiving the reception signals using the receiver chains 108.

Turning back to FIG. 10, and as previously discussed, the memory 14 (e.g., using memory device 134 of FIG. 7) of the electronic device 10 may store the antenna gain lookup table 250. During operation, the electronic device 10, may retrieve the precise transmitter antenna gain 120 of a particular antenna 122 for a beamformed signal of a particular direction at a particular frequency. As shown, the electronic device 10 may include an application processor (AP) 262 (e.g., the processor 12), a baseband (BB) block 264, an intermediate frequency (IF) block 266, and a mmWave (mmW) block 268.

The application processor 262 may process applications and functions generally performed by the electronic device 10 (e.g., processing graphic-related tasks (e.g., during gaming), processing images, converting video file formats, etc.). The application processor 262 may also process each function of the communication circuitry 100, corresponding to the baseband block 264, the intermediate frequency block 266, and the mmWave block 268. That is, the application processor 262 may also perform functions of converting transmission data to a baseband digital signal, modulating it to change its frequency to an intermediate frequency before amplification (e.g., using the PA 110 of FIG. 7), and then up-converting the intermediate frequency to mmWave frequency for transmitting the signal to contribute to a beamformed signal. In some embodiments, the application processor 262 may also perform these functions related to the communication circuitry 100. The application processor 262, the baseband block 264, the intermediate frequency block 266, and the mmWave block 268 may perform similar functions for the reception signals received by the receiver chain 108 (e.g., down converting mmWave signals to IF and to then to BB 264 for processing). After receiving a back off power signal, the electronic device 10 may adjust the input power while transmitting the transmission signals or receiving the reception signals on a mmWave frequency.

Figure 11:
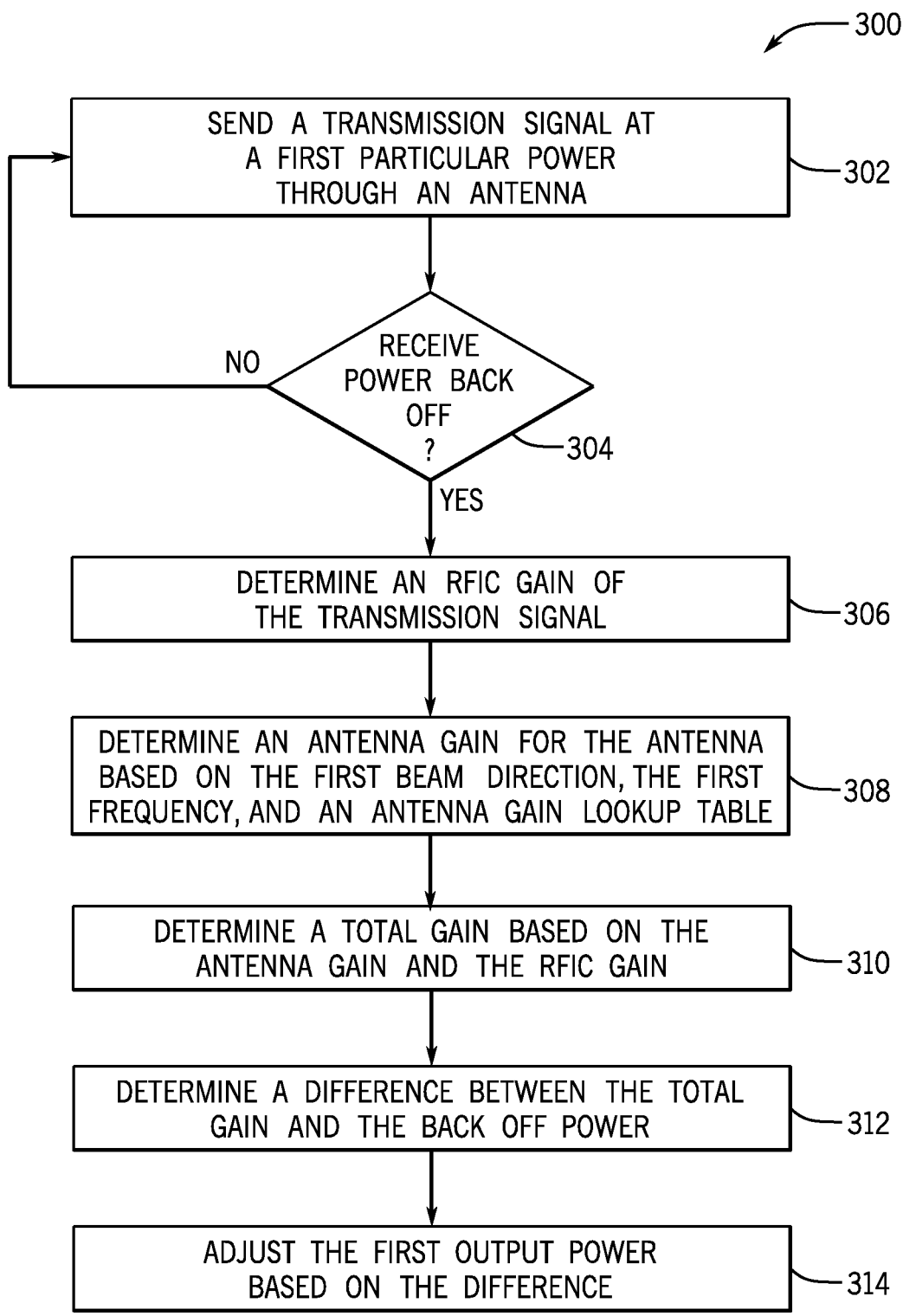
FIG. 11 is a flowchart illustrating a method for adjusting power of the antennas using the antenna gains, according to embodiments of the present disclosure.

To illustrate, FIG. 11 is a flowchart of a method 300 for adjusting power of the antenna 122 using the transmitter antenna gains 120, according to embodiments of the present disclosure. Any suitable device that may control components of the communication circuitry 100, such as the transceiver 30 and/or the controller 130, may perform the method 300. In some embodiments, the method 300 may be implemented by executing instructions stored in a tangible, non-transitory, computer-readable medium, such as the one or more memory devices 14, using a processor, such as the one or more processors 12. The processor 12 of the electronic device 10 may execute instructions to perform the method 300 that are stored (e.g., in memory 14) and carried out by the transceiver 30 and/or the controller 130 of the electronic device 10. While the method 300 is described using steps in a specific sequence, it should be understood that the present disclosure contemplates that the described steps may be performed in different sequences than the sequence illustrated, and certain described steps may be skipped or not performed altogether. Moreover, although the following discussions describe the method 300 implemented for transmitting the transmission signals, the method 300 may additionally or alternatively be implemented for receiving the reception signals using the receiver chain 108, as described with respect to FIG. 7.

The processor 12 (e.g., of the electronic device 10 and/or integrated with or controlling the transceiver 30) may process signals using the communication circuitry 100, as described with respect to FIG. 7. In some embodiments, the communication circuitry 100 of the transceiver 30 described herein may include a half-duplex radio frequency transceiver for transmitting either the transmission signals or receiving the reception signals. Additionally or alternatively, the communication circuitry 100 may include a full-duplex radio frequency transceiver for transmitting the transmission signals and receiving the reception signals concurrently.

At process block 302, the processor 12 may send a transmission signal at a particular input power through an antenna 122, which may contribute to a beamformed signal in a first beam direction at a first frequency. In some instances, the antenna 122 may be within an impermissible range from human contact when transmitting the transmission signal at a certain power level. As previously discussed, the Federal Communications Commission (FCC) regulates the power transmitted from the transmitter antenna 122 when a person is in close proximity to the antenna 122. The regulations have specific maximum permissible exposure (MPE) requirements for radiated electric fields, magnetic fields, and power density. The MPE requirements are derived from a specific absorption rate (SAR) at which tissue absorbs RF energy, usually expressed in watts per kilogram (W/kg). The regulations vary with frequency. In particular, the most stringent requirements are for the mmWave range, including 30 to 300 MHz, because various human body resonances fall in that frequency range. Thus, when the antenna is within a particular distance (e.g., impermissible distance) from making human contact (e.g., while communicating on the mmWave) and emitted a power level greater than an MPE threshold value or range, the electronic device 10 may receive a back off power signal.

That is, after sending the transmission signals, at decision block 304, the processor 12 may determine whether the electronic device 10 receives a back off power signal. The back off power signal indicates that the electronic device 10 is not within a permissible range with respect to a human when transmitting at the present transmission power. In some embodiments, the electronic device 10 may store instructions or a program (e.g., in memory 14) that cause the electronic device 10 to generate a back off power signal when sensors on the electronic device 10 indicate that the power emitted by transmitter antennas 122 of the electronic device 10 do not meet MPE requirements. Additionally or alternatively to the electronic device 10 generating the back off power signal, a base station communicating with the electronic device 10 may determine that the electronic device 10 does not meet MPE requirements. As such, the electronic device 10 and/or a base station may send the back off power signal to the processor 12. The back off power signal may specify a power level (e.g., a gain) the electronic device 10 should use to transmit the transmission signals from the antennas 122. If the electronic device 10 does not receive the back off power signal, then the processor 12 may continue sending the transmission signals through the antennas 122 contributing to the beamformed signal at the first beam direction at the first frequency using the present input powers.

On the other hand, if the processor 12 receives the back off power signal, at process block 306, the processor 12 determines the transmitter RFIC gain 113 of the transmission signal in the RFIC circuitry 102 using the transmitter PD 111. Specifically, and as discussed with respect to FIG. 7, the transmitter PD 111 may determine the transmitter RFIC gain 113 in the transmitter chain 106 after the PA 110 amplifies the transmission signal and prior to the antenna 122 transmitting the transmission signal. Additionally or alternatively, the processor 12 may look up the transmitter RFIC gain 113 stored in the corresponding antenna gain lookup table 250 (e.g., for the electronic device 10 emitting a beamformed signal having the first direction at the first frequency using the particular input power), as described with respect to FIG. 10.

Next, at process block 308, the processor 12 determines a transmitter antenna gain 120 for the antenna 122 based on the first beam direction of the beamformed signal, the first frequency of the beamformed signal, the first PA input 252, the device identifier, and the corresponding antenna gain lookup table 250. As discussed with respect to FIG. 10, the antenna gain lookup table 250 provides the antenna gain 120 for the antenna 122 corresponding to the first PA input 252 of the electronic device 10 (e.g., for the electronic device X identified by the device identifier and transmitting the transmission signals contributing to a beamformed signal communicating in a particular direction at a particular mmWave frequency). In some embodiments, and as previously mentioned, the electronic device 10 may store multiple antenna gain lookup tables 250. Each of the antenna gain lookup tables 250 may correspond to a particular beam direction and/or a particular frequency. Thus, the processor 12 determines the transmitter antenna gain 120 for the antenna 122 using an antenna look up table 250 for the first beam direction (e.g., 45° with respect to the base station) at the first frequency (e.g., 30 MHz).

At process block 310, the processor 12 may determine the total transmission gain (e.g., RF power 255 of FIG. 10) based on the transmitter antenna gain 120 and the transmitter RFIC gain 113. That is, the processor 12 may add the transmitter RFIC gain 113 and the transmitter antenna gain 120 to determine the total transmission gain. After determining the total transmission gain, at process block 312, the processor 12 may determine a difference between the total transmission gain and the back off power signal. Subsequently, at process block 314, the processor 12 may adjust the input power based on the difference between the total transmission gain and the back off power signal (e.g., specific power level for the antenna 122 to back off when sending the transmission signal that contributes to the beamformed signal). The processor 12 may perform a similar process for multiple antennas 122 sending the multiple transmission signals contributing to the beamformed signal.

By way of example, a first device and a second device may transmit signals that contribute to a beamformed signal having a first frequency and directed at a first direction. In this example, the transmitter RFIC gains 113 for each of the transmission signal from a first antenna 122 of the first device and the first antenna 122 of the second device are the same, 18 dB. Additionally, the transmission signal from the first antenna 122 of the first device has an antenna gain 120 of 2 dB while the second device has an antenna gain 120 of 7 dB. As such, the total transmission gain for the transmission signal from the first antenna 122 of the first device is 20 dB (e.g., sum of the transmitter RFIC gain 113 of 18 dB and the antenna gain 120 of 2 dB). The total transmission gain for the transmission signal from the first antenna 122 of the second device is 25 dB (e.g., sum of the transmitter RFIC gain 113 of 18 dB and the antenna gain 120 of 7 dB).

In some embodiments, without the antenna gain lookup table 250, the processors 12 of these devices may use predetermined antenna gains 120 when determining the total transmission gains for each of the transmission signals from the first antennas 122 of the first device and the second device. For safety reasons, the predetermined antenna gains 120 may be set to maximum transmitter antenna gains 120 for the device type (e.g., as determined during manufacturing). As such, the predetermined antenna gains 120 may overcompensate or exaggerate the transmitter antenna gains 120. The predetermined transmitter antenna gains 120 may include a value of 7 dB, which may be the maximum antenna gains 120 for the device type of the first device and the second device. Since the transmitter RFIC gains 113 for each of the transmission signals from the first antenna 122 of the first device and the first antenna 122 of the second device are the same, 18 dB, and the predetermined transmitter antenna gains 120 for the transmission signals emitted from the antennas 122 for the device type are 7 dB, the processors 12 of the first device and the second device determine the total transmission gains to be 25 dB. However, and as described above, the total transmission gain of the transmission signal from the first antenna 122 of the first device is actually 20 dB. Thus, using the predetermined antenna gain 120 of 7 dB causes the processor 12 of the first device to overestimate the total transmission gain by 5 dB (e.g., 25 dB instead of actual 20 dB).

The first device and the second device may receive the back off power signal to back off power to 15 dB. As such, both devices may attempt to reduce their input power levels such that the total transmission gains are in turn reduced by 10 dB (e.g., difference between the total transmission gains of 25 dB and the back off power level of 15 dB). However, using the techniques described herein, and as previously discussed in this example, the total transmission gains of the transmission signal from the first antenna 122 of the first device and the transmission signal from the first antenna 122 of the second device, may be precisely determined. In particular, the processor 12 of the first device and the processor 12 of the second device may cause the PDs 111 to measure or look up the transmitter RFIC gains 113, which have a value of 18 dB. The processors 12 may also look up the respective antenna gains 120 for each of the first antennas 122 of the respective first device and the second device.

As such, the first device should back off power by 5 dB (e.g., rather than 10 dB as determined without using the techniques described herein) while the second device should back off power by 10 dB (e.g., no change). Thus, the techniques described herein, such as for determining total transmission gains based on the antenna gains 120 and the transmitter RFIC gains 113, allow for a more efficient and precise adjustment of the input power when transmitting or receiving signals from the antenna 122 to a particular power level (e.g., back off power level). That is, because processor 12 may look up the transmitter antenna gains 120 in the antenna gain lookup table 250 for determining the total transmission gains, the processor 12 may cause the device to back off to the precise power value indicated by the back off signal in a single adjustment.

Although not depicted, the method 300 may apply similarly to reception signals. That is, the processor 12 may receive a reception signal through the antenna 122 at a particular beam direction and at a particular frequency. The processor 12 may also receive a back off power, and determine a receiver RFIC gain associated with a receiver chain 108 using a receiver PD 112. Moreover, the processor 12 may determine the receiver antenna gain 120 for the antenna 122 receiving the reception signal based on the particular beam direction, the particular frequency, and the antenna gain lookup table 250. In response to determining the receiver RFIC gain and determining the receiver antenna gain 120 (e.g., as stored in the antenna gain lookup table 250 corresponding to the particular beam direction and particular beam frequency for the beamformed signal, an input power to the receiver, and the electronic device identifier), the processor 12 may determine the total reception gain based on the receiver RFIC gain 119 and the receiver antenna gain 120. Furthermore, the processor 12 may adjust the input power to the receiver for the reception signal based on the total reception gain and the back off power after the antenna 122 receives the reception signal and prior to sending the reception signal to the respective receiver chain 108. Furthermore, the processor 12 may perform similar processes for multiple antennas 122 receiving the reception signals.

In some embodiments, the techniques disclosed herein may also provide a user of the electronic device 10 with an indication for communicating signals with a relatively stronger signal strength. In particular, and as discussed above, the antenna gain lookup tables 250 may include the transmitter antenna gains 120 for transmission signals contributing to a beamformed signal transmitting in a particular direction at a particular frequency. The processor 12 of the electronic device 10 may determine the total transmission gains using the transmitter antenna gains 120. The total transmission gains may indicate the maximum RF power for each of the transmission signals contributing to the beamformed signal. Moreover, as previously discussed, the electronic device 10 may store multiple antenna gain lookup tables 250 in the memory 14 for the multiple beam directions at multiple frequencies for the beamformed signal. For each of the antenna gain lookup tables 250 (e.g., for the transmission signals contributing to the beamformed signal transmitting in a first direction, in a second direction, and so forth and/or at a first frequency, a second frequency, and so forth) the processor 12 may determine the total transmission gains. Determining the total transmission gains for the transmission signals from each of transmitters (e.g., a first transmitter chain 106 and a first antenna 122) may provide information indicating the strongest signal strength using a combination of a particular beam direction at a beam frequency for sending the transmission signals. Using this information, the processor 12 may also provide an indication to a user of the electronic device 10 to change the attitude or position of the electronic device 10 to increase or maximize signal strength. That is, the attitude or position may correspond to the beam direction that provides greater or the greatest total transmission gains. By way of example, the processor 12 may cause the electronic device 10 to display a recommendation and/or an indication on a graphical user interface (GUI) of a position (e.g., direction) with respect to a base station that may provide the stronger and/or the strongest signal strength for communicating. Additionally or alternatively to providing the recommendation, the processor 12 may change the beam direction to the new direction that provides the greater or the greatest total transmission gains.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A radio frequency device comprising:
   a transmitter chain configured to transmit a transmission signal at an input power via a first antenna of a plurality of antennas to form a beamformed signal having a first beam direction at a first frequency;
   a memory configured to store a plurality of antenna gains for the plurality of antennas associated with beamforming; and
   processing circuitry communicatively coupled to the transmitter chain and the memory, the processing circuitry configured to
   receive a radio frequency integrated circuit (RFIC) gain associated with the first antenna based on a back off power signal,
   receive a first antenna gain associated with the first antenna based on the first beam direction, the first frequency, and the plurality of antenna gains, and
   cause the transmitter chain to adjust the input power based on the RFIC gain, the first antenna gain, and the back off power signal.

2. The radio frequency device of claim 1, wherein the processing circuitry is configured to determine a total transmission gain associated with the first antenna based on the RFIC gain and the first antenna gain.

3. The radio frequency device of claim 2, wherein the processing circuitry is configured to cause the transmitter chain to adjust the input power based on a difference between the back off power signal and the total transmission gain.

4. The radio frequency device of claim 1, wherein the processing circuitry is configured to
receive a second antenna gain associated with the first antenna based on the plurality of antenna gains and a second beam direction different than the first beam direction, and
determine the second beam direction as providing a stronger signal strength for transmitting the transmission signal than the first beam direction based on the second antenna gain.

5. The radio frequency device of claim 4, wherein the processing circuitry is configured to control a transmitter phase shifter of the transmitter chain to steer the beamformed signal to the second beam direction.

6. The radio frequency device of claim 1, wherein the processing circuitry is configured to receive a second antenna gain associated with the first antenna based on the plurality of antenna gains, the first beam direction, and a second frequency different than the first frequency, and
determine the first beam direction at the second frequency as providing a stronger signal strength for transmitting the transmission signal than the first beam direction at the first frequency based on the second antenna gain.

7. The radio frequency device of claim 1, wherein the processing circuitry is configured to receive the RFIC gain prior to the gain being amplified by the first antenna.

8. The radio frequency device of claim 1, wherein the processing circuitry is configured to receive the RFIC gain prior to the gain being amplified by a power amplifier.

9. The radio frequency device of claim 1, wherein the plurality of antennas comprises a second antenna, and the plurality of antenna gains comprises a second antenna gain associated with the second antenna for the first beam direction at the first frequency different than the first antenna gain.

10. The radio frequency device of claim 1, wherein the memory is configured to store a plurality of RFIC gains for the plurality of antennas associated with the beamforming.

11. The radio frequency device of claim 1, wherein the first frequency of the beamformed signal is within a millimeter wave frequency range.

12. The radio frequency device of claim 1, wherein the processing circuitry is configured to cause the transmitter chain to adjust the input power to a power level indicated in a single adjustment.

13. The radio frequency device of claim 1, wherein the processing circuitry is configured to receive the back off power signal based on the plurality of antennas being within a threshold range of a user.

14. The radio frequency device of claim 1, wherein the processing circuitry is configured to control a power amplifier supply voltage provided to a power amplifier of the transmitter chain to cause the transmitter chain to adjust the input power.

15. The radio frequency device of claim 14, wherein the memory is configured to store the power amplifier supply voltage.

16. A tangible, non-transitory, computer-readable medium, comprising instructions that, when executed by a processor, cause operations to be performed comprising:
transmitting a transmission signal at an input power via an antenna of a plurality of antennas to form a beamformed signal having a beam direction at a frequency;
receiving a radio frequency integrated circuit (RFIC) gain associated with the antenna based on receiving a back off power signal;
receiving an antenna gain associated with the antenna based on the beam direction, the frequency, and a plurality of antenna gains for the plurality of antennas associated with beamforming; and
causing a transmitter chain to adjust the input power based on the RFIC gain, the antenna gain, and the back off power signal.

17. The tangible, non-transitory, computer-readable medium of claim 16, the operations comprising determining a total transmission gain associated with the antenna based on the RFIC gain and the antenna gain.

18. A radio frequency device comprising:
a first transmitter chain configured to transmit a first transmission signal via a first antenna of a plurality of antennas;
a second transmitter chain configured to transmit a second transmission signal via a second antenna of the plurality of antennas to form a beamformed signal with the first transmission signal; and
a memory configured to store an antenna gain data structure including a plurality of antenna gains for the plurality of antennas associated with a beam direction at a particular frequency, wherein the plurality of antenna gains is indexed using a total transmission power parameter.

19. The radio frequency device of claim 18, wherein the memory is configured to store a second antenna gain data structure including a second plurality of antenna gains associated with a second beam direction at a second particular frequency.

20. The radio frequency device of claim 18, comprising a radio frequency integrated circuit (RFIC), the RFIC comprising the first transmitter chain and configured to provide an RFIC gain, the first antenna being configured to provide an antenna gain, and the plurality of antenna gains comprising the antenna gain.

* * * * *